United States Patent [19]

Hashimoto

[11] Patent Number: 5,258,875
[45] Date of Patent: Nov. 2, 1993

[54] VIDEO TAPE RECORDER WITH THE FUNCTION OF REPETITIVE PLAYBACK

[75] Inventor: Kazuo Hashimoto, Tokyo, Japan
[73] Assignee: Hashimoto Corporation, Tokyo, Japan
[21] Appl. No.: 731,066
[22] Filed: Jul. 17, 1991
[30] Foreign Application Priority Data Jul. 20, 1990 [JP] Japan .................................. 2-192610

[51] Int. Cl.$^5$ .............................................. H04N 7/00
[52] U.S. Cl. ........................................ 360/15; 360/60;
360/62; 358/335
[58] Field of Search ..................... 360/14.1, 15, 55, 60,
360/62, 69; 358/10, 335; 369/84

[56] References Cited

U.S. PATENT DOCUMENTS 4,428,001 1/1984 Yamamura et al. ................. 358/335
5,025,324 6/1991 Hashimoto ........................ 360/15 X
5,055,937 10/1991 Yamada et al. ................. 360/14.1 X

FOREIGN PATENT DOCUMENTS 2164194 3/1986 United Kingdom .
2192320 1/1988 United Kingdom .
2234848 2/1991 United Kingdom .

Primary Examiner—Paul Gensler
Attorney, Agent, or Firm—Lowe, Price, LeBlanc & Becker

[57] ABSTRACT

A video tape recorder with the function of repetitive playback mainly used for learning purposes detects whether a recordable tape or a playback only tape is used as a master tape when driving independently two video tapes with tape ends to be used as a slave tape and a master tape, respectively. When it is detected that a recordable tape is used, at first the two tapes are simultaneously driven in a recording condition by manipulating a record button and then a desired range of the slave tape is repeatedly rewound and replayed by pressing and releasing a playback button for a required time period. When it is detected that a playback only tape is used, on the other hand, only the slave tape is driven in a recording condition by a similar manipulation, and while the slave tape is repeatedly rewound and replayed, the master tape playback operation is suspended.

4 Claims, 5 Drawing Sheets

VIDEO TAPE RECORDER WITH THE FUNCTION OF REPETITIVE PLAYBACK

TECHNICAL FIELD

The present invention relates to an audiovisual educational apparatus using video tape recorders and having a repetitive playback function.

BACKGROUND ART

A series of operations including rewinding, playing back, rewinding, fast forwarding and playing back has to be manually repeated each time a video on the screen of a video tape recorder is played back, provided only one video tape recorder is employed. As these operations require much attention, it tends to become difficult to concentrate a learner's attention to the study; obviously, such an audiovisual apparatus has been proved unsatisfactory.

An audiovisual educational apparatus of the sort conventionally considered to be an ideal one is such that it functions to receive broadcasts in general and allows a video on tape T-1 to be repeatedly viewed without interrupting the process of video recording on tape T-2. Also, the apparatus simultaneously functions to infinitely repeat the viewing of the video on tape T-1 while permitting interruptions of the video recording operation on tape T-2 so that the contents already recorded on the tape (whose record tab has been removed) may be studied. If the conventional independent video tape recorder provides both the functions stated above, however, an extremely complicated mechanism is necessary to perform the operation in linkage with such functions.

SUMMARY OF THE INVENTION

In order to solve the foregoing problems, an object of the present invention is to provide a repetitive playback apparatus for two video tape recorders which are similar in construction and accommodating tapes T-1 and T-2, respectively. Foregoing T-1 and T-2 are set to a video recording condition by pressing a recording button equipped on a remote control box only once, and the video recording condition can be checked by a monitor. When studying is attempted by infinitely playing back a range while monitoring the video recording condition, a playback button is pressed to play back T-1 infinitely with T-2 kept in a recording condition. Accordingly, in case of recording a TV program, T-2 is allowed to continue video recording without interruption while T-1 is being repeatedly played back. When a pre-recorded video tape is used for learning purposes, T-2 is kept on standby while T-1 is set to the infinite playback condition. Further, T-1 and T-2 are simultaneously set to the video recording condition by pressing the record button after the studying is terminated. With the construction described above, the invention enables a user to preset a range for repeated playback as desired by using a tape with tape ends, whereas endless tapes conventionally set as T-1 allow only limited range to repeated playback.

BRIEF DESCRIPTION OF DRAWINGS

FIGS. 4-1 to 4-4 show flowcharts illustrating interruptions according to remote signals; FIG. 4-1 is according to a first remote control signal; FIG. 4-2 is according to a second remote control signal; FIG. 4-3 is according to a third remote control signal; and FIG. 4—4 is according to a fourth remote control signal.

DESCRIPTION OF THE PREFERRED EMBODIMENTS

The constitution of an embodiment of the present invention will subsequently be described by reference to FIG. 1.

Figure 1:
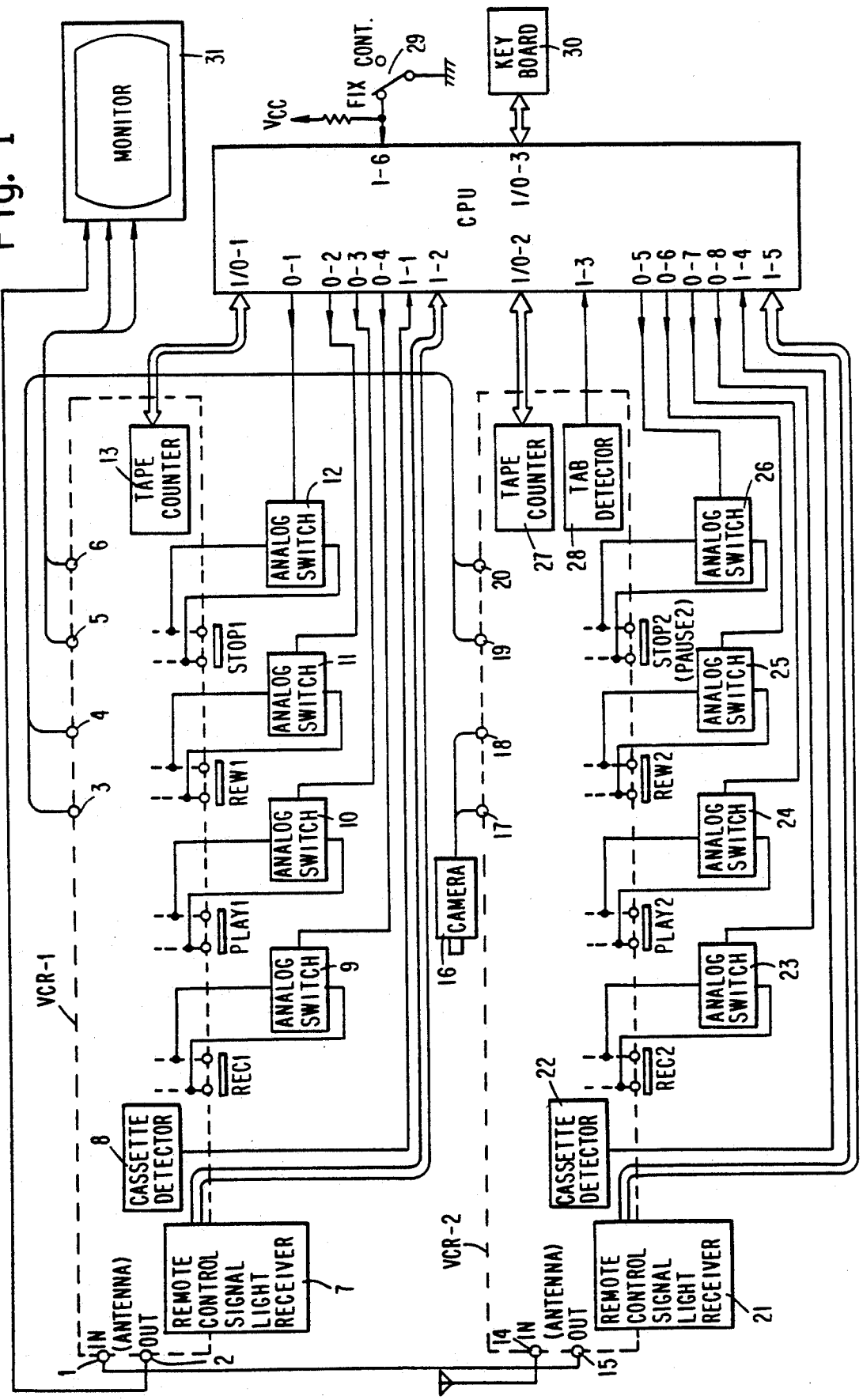
FIG. 1 is a circuit diagram of one embodiment of the present invention.

In FIG. 1, VCR 1 is a video tape recorder for a cassette tape with tape ends (not shown), hereinafter referred to as the slave tape T-1. Only principal parts relating to the present invention are shown. More specifically, numeral 1 refers to an antenna input terminal, 2 to an antenna output terminal, 3 to a video input terminal, 4 to an audio input terminal, 5 to a video output terminal, 6 to an audio output terminal, and 7 to a remote control signal light receiver for receiving a remote control signal in the form of a coded infrared ray transmitted from a remote control transmitter (also called a remote control box, not shown). The output of the receiver 7 is led to an input port I-2 of a CPU, which will be described later. Further, numeral 8 refers to a cassette detector for detecting the insertion of the slave tape T-1. REC 1 is a record button, PLAY 1 is a playback button, REW 1 is a rewind button, and STOP 1 is a stop button. Analog switches 9 to 12 are disposed in parallel and induce the same operations as would be caused by manual pressing of the buttons. The CPU controls the analog switches so that each is turned on/off according to respective commands from output ports 0-1 to 0-4 of the CPU. The same arrangement is applied to REC 2, PLAY 2, REW 2 and STOP 2 of VCR-2. Further numeral 13 denotes a tape counter for counting the traveling amount of the tape by the second as it is publicly known. The tape counter is used when a predetermined range of the slave tape T-1 is repeatedly replayed.

VCR-2 is a video tape recorder for a cassette tape with tape ends (not shown), hereinafter called the master tape T-2. In this case, numeral 14 refers to an antenna input terminal, 15 to an antenna output terminal, 16 to a camera, 17 to a video input terminal, 18 to an audio input terminal, 19 to a video output terminal, 20 to an audio output terminal, 21 to a remote control signal light receiver similar to receiver 7 discussed above, 22 to a cassette detector similar to detector 8 discussed above, 23 to 26 to analog switches, and 27 to a tape counter similar to counter 13 discussed above. The CPU is a one-chip microprocessor containing a ROM (not shown) for storing programs and a plurality of processing registers (not shown). Numerals 0-1 to 0-8 refer to output ports, I-1 to I-6 to input ports, and I/0-1 to I/0-3 to input/output ports.

Further, numeral 28 refers to a tab detector for detecting a record tab being removed, which prevents video information recorded on the cassette tape from being erased, and numeral 29 refers to a changeover switch for switching the playback mode of the slave tape T-1 stated above. When the changeover switch 29 is turned to "FIX" side, the slave tape T-1 is repeatedly replayed for the predetermined time set by a timer, which will be described later. On the other hand, when it is turned to "CONTINUOUS" side, the slave tape T-1 is repeatedly replayed for the range that has been rewound in a review condition (in which the analog switches 10 and 11 are held on) while a monitor 31 is being viewed.

Numeral 30 refers to a timer setting keyboard having numeral keys 0 to 9, a registration key and an input (return) key in this embodiment. When 30 seconds are registered with the timer, for instance, the registration key. No. 3 key, No. 0 key and the input key are pressed in order. A DIP switch instead of the keyboard may be used, and when the present device is desired to be incorporated into the whole system, the built-in channel selection keys of any standard video tape recorder or he channel selection keys of a remote control transmitter may otherwise be utilized.

The operation will be subsequently described in detail with reference to the flowcharts of FIGS. 2 to 4.

When the power supply button of the remote control transmitter (not shown) is pressed to turn on the power supplies of the video tape recorders VCR-1 and VCR-2 as shown in FIG. 1, a coded infrared ray is emitted and the power supplies are turned on by the built-in circuits of the VCR-1 and VCR-2 via the remote control signal light receivers 7 and 21, respectively.

As will be described later, the operation described above is unnecessary in the case of video tape recorders whose power supplies are turned on only by inserting the slave tape T-1 and the master tape T-2.

When the slave tape T-1 is subsequently inserted into the video tape recorder VCR-1, an output is generated from the cassette detector 8 and the output is applied to the input port I-1.

Figure 2:
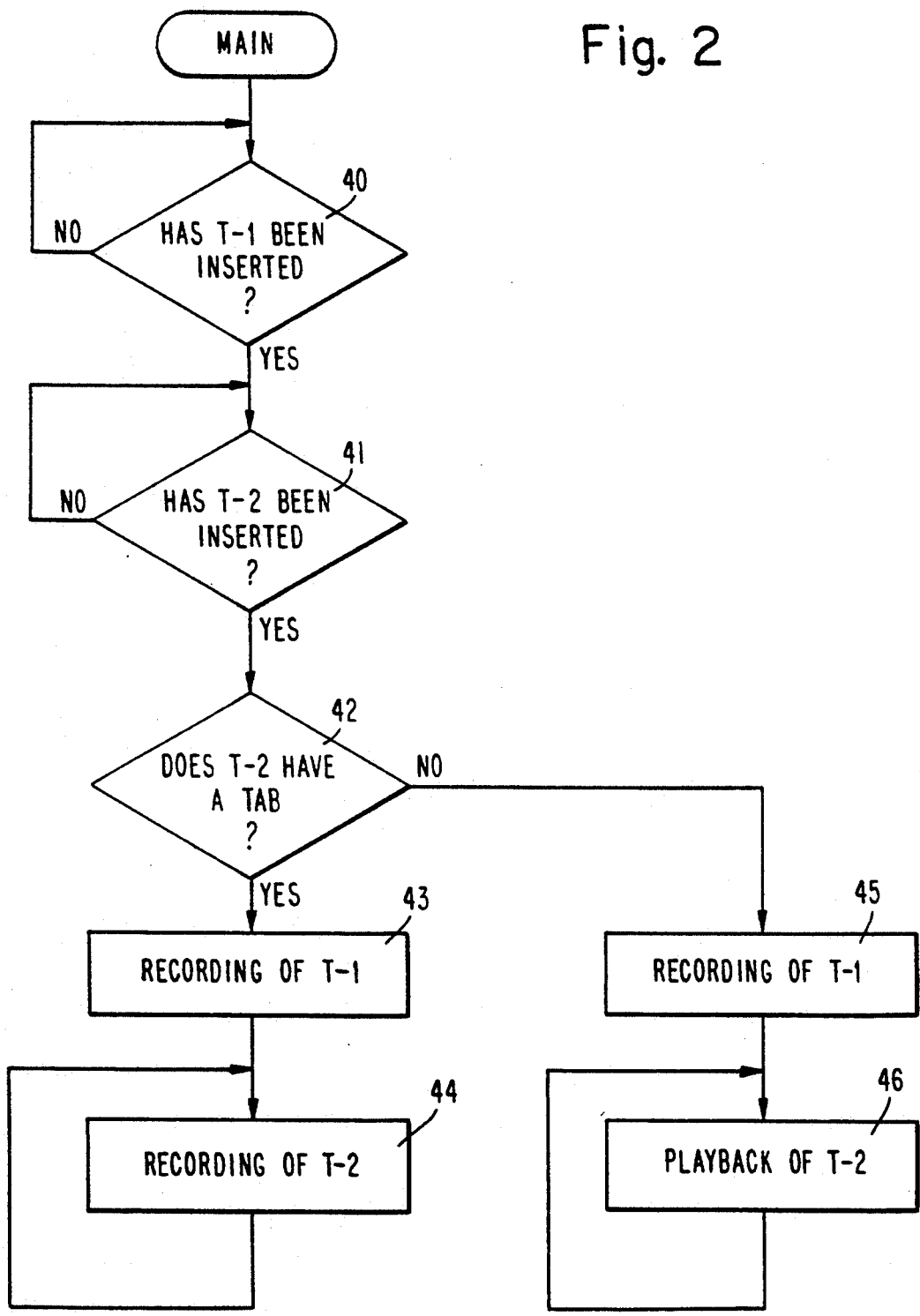
FIG. 2 is a main flowchart showing operation of the invention.
Figure 3A:
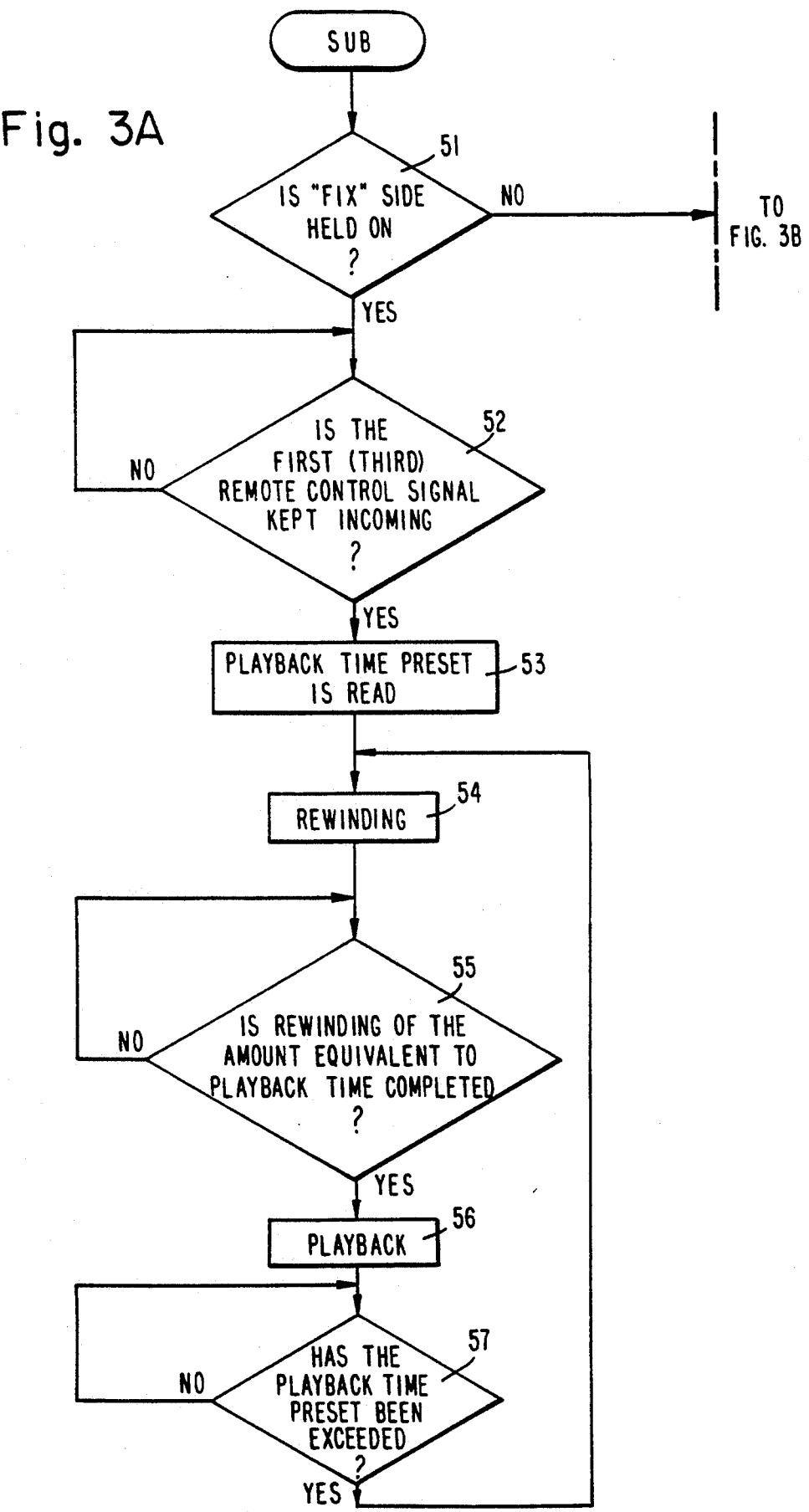
FIG. 3 is a sub-flowchart.
Figure 3B:
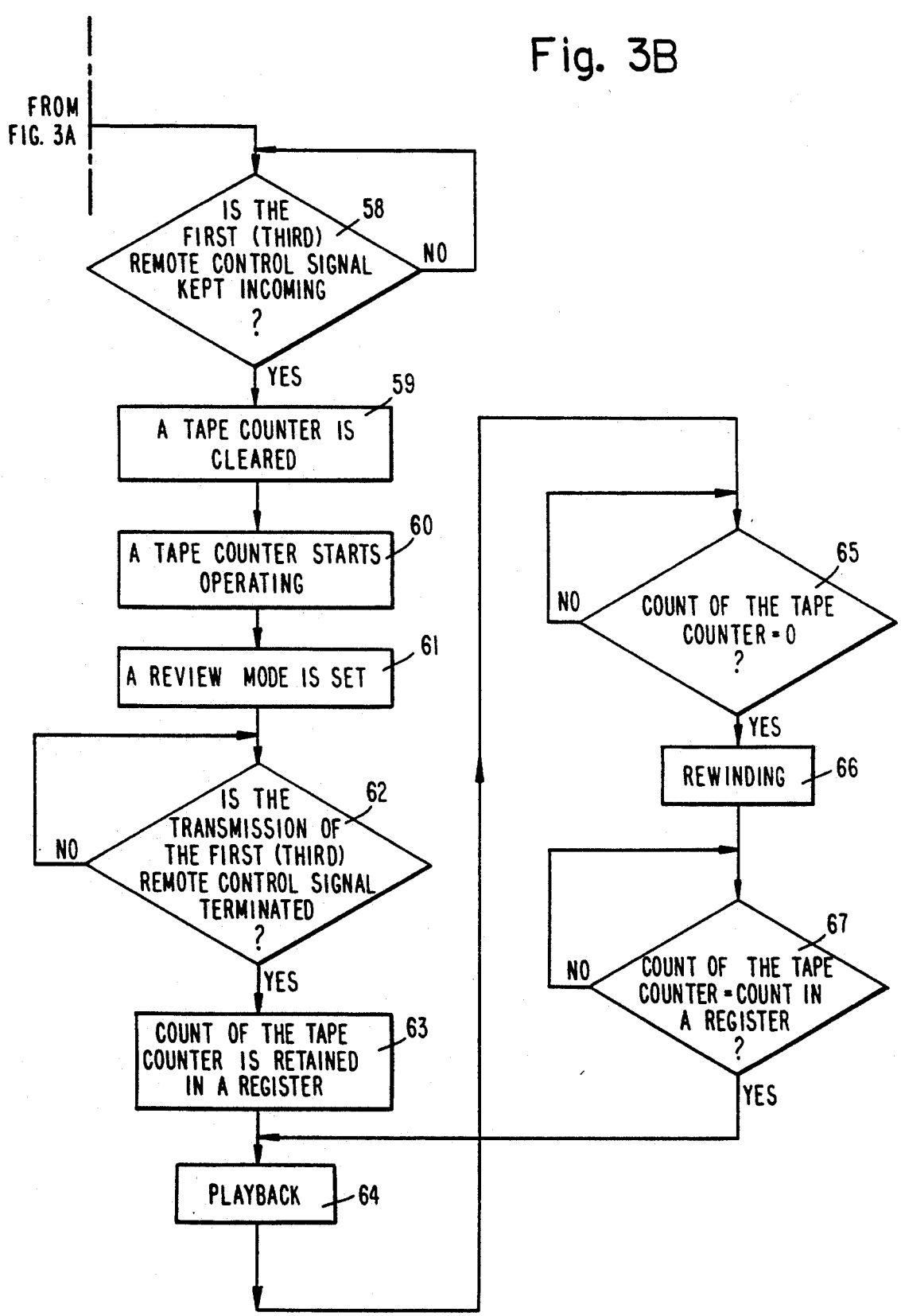
Figure 4A:
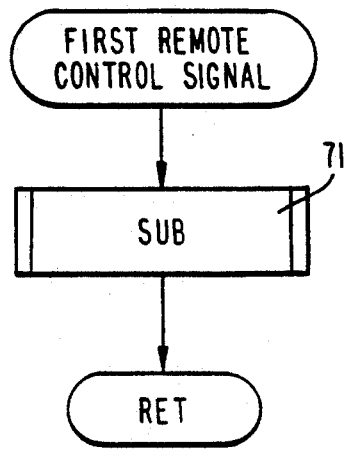
Figure 4B:
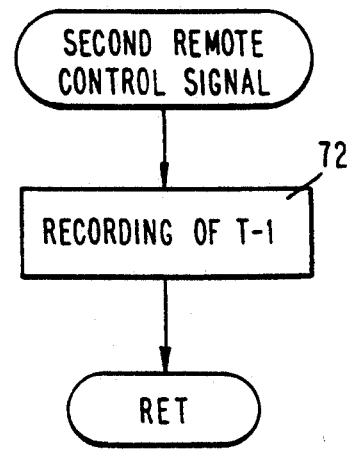
Figure 4C:
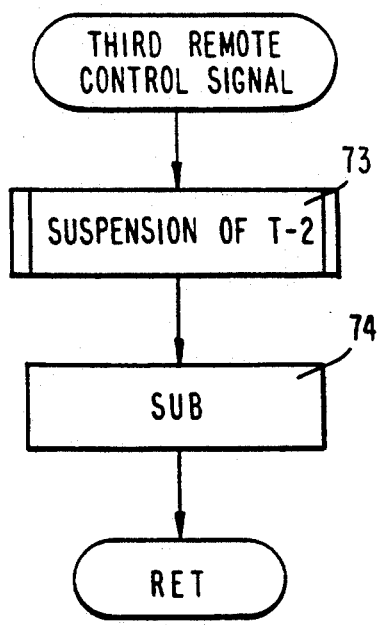
Figure 4D:
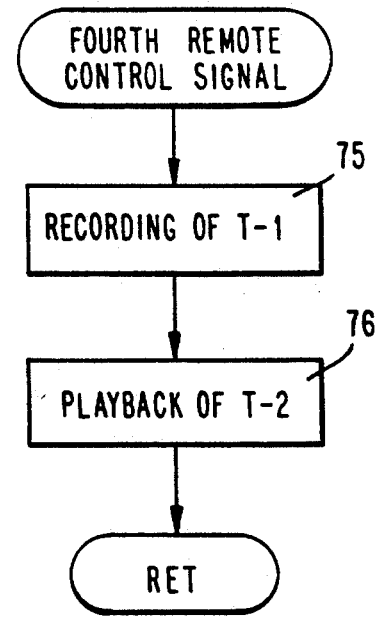

When the output is detected in Step 40 of FIG. 2, this step becomes YES and the next Step 41 follows. In Step 41, testing is undertaken to check whether the master tape T-2 has been inserted. When the master tape T-2 is inserted, Step 41 becomes YES and Step 42 follows. In Step 42, testing is undertaken to examine whether or not the record tab of the master tape T-2 has been removed. With the presence of the record tab, the slave tape T-1 and the master tape T-2 are driven in the recording condition in Steps 43 and 44, respectively. In other words, the analog switches 9 and 23 are turned on according to the commands from the output ports 0-4 and 0-8 to produce the same operation as would be caused by pressing the recording buttons REC 1 and REC 2.

Further, a TV program on the air received through the antenna input terminal 14 or the output of the camera 16 is input to VCR-2 and video-recorded on the master tape T-2.

When the master tape T-2 without the record tab for learning purposes is inserted into VCR-2, on the other hand, the decision in Step 42 becomes NO. Although the slave tape T-1 is set to the video recording mode in Step 45, as in Step 43, the master tape T-2 is set to the playback mode in Step 46 unlike Step 44.

When a tape with the record tab is inserted as the master tape T-2, a first remote control signal (for rewinding) is transmitted from the remote control transmitter (not shown) to the remote control signal light receiver 7. When receiver 7 detects remote control signal as indicated at the input port -2 of the CPU, interruption is caused to occur and a subroutine of FIG. 4-1 is called. In addition, a subroutine called "SUB" of FIG. 3 is called in Step 71.

In Step 51, testing is undertaken to determine whether the changeover switch 29 of FIG. 1 has been turned to the "FIX" side. When the "FIX" is held on as shown in FIG. 1, the input port I-6 is at low level and Step 51 becomes YES. Consequently, Step 52 follows in which testing is undertaken to determine whether the first remote control signal (for rewinding) is kept incoming. When continuous input of the first remote control signal is confirmed, this step becomes YES and the next Step 53 follows. In Step 53, the time period fixed by timer (playback time of the slave tape T-1), e.g. 30 seconds, by using the keyboard 30, is read as described above. Subsequently, rewinding of the slave tape T-1 is started by turning on the analog switch 11 according to the command from the output port 0-2 in Step 54. Upon confirming the commencement of rewinding, the transmission of the first remote control signal is cut off. In Step 55, the count is then read from the rewinding tape counter 13 with the input/output port I/0-1 set to an input mode, and rewinding is terminated when the rewinding amount of the slave tape T-1 reaches what is equivalent to 30 seconds. The next Step 56 then follows, and the mode is switched from the rewinding mode to the playback mode. In other words, the analog switch 10 is turned on according to the command from the output port 0-3. In this playback mode, the video and sound recorded on the slave tape T-1 can be made audiovisual through the monitor 31 via the video output terminal 5 and the audio output terminal 6. The playback mode is maintained until the condition becomes affirmative in the next Step 57, i.e., until the 30 seconds elapse in the embodiment shown above. When 30 seconds elapse, the program flow returns to Step 54. Since Steps 54-57 are looped, the video on the screen for the period of 30 seconds is repeatedly rewound and played back until an interruption is caused by the remote control signal indicating the next operation to be performed.

When the changeover switch 29 is turned to the "CONTINUOUS" side, not to the "FIX" side, the input port I-6 is set at H level. On detecting the H level, Step 51 becomes NO and then Step 58 follows. In Step 58, testing is undertaken to find whether the first remote control signal is kept incoming. When the first remote control signal is found incoming, the input/output port I/0-1 is switched to the output port state so as to send the command for clearing the tape counter (Step 59), and after setting the tape counter 13 to a counting condition (Step 60), VCR-1 is set to a review mode for rewinding the slave tape T-1 in the playback condition (Step 61). In other words, the slave tape T-1 is rewound according to the command from the output port 0-2 after the slave tape T-1 is set to the playback condition according to the command from the output port 0-3. In this review mode, a playback video on the slave tape T-1 can be viewed on the monitor 31 while rewinding the slave tape T-1, and this review mode continues while the first remote control signal is being sent out. When the transmission of the first remote control signal is terminated after the tape has been rewound up to the position desired, Step 62 becomes YES and the count of the tape counter 13 is retained in one of the registers (not shown) of the CPU. Subsequently, the slave tape T-1 is switched to the constant-speed playback mode when the analog switch 11 is turned off in Step 64, whereby the playback video can be viewed on the monitor 31.

The tape counter 13 is reset to "0" in Step 59, and its absolute value increases to the minus direction like "−1," "−2"... while the tape is being rewound. The absolute value in the counter decreases during the time the tape is replayed. As a result, the count of the tape counter 13 becomes "0" when the slave tape T-1 reaches the position where the aforementioned review is started in the constant-speed playback mode. Step 65 therefore becomes YES and rewinding (or review) is started in Step 66. The count of the tape counter 13 is read while rewinding, and when the count coincides with what has been stored in the register in Step 63, Step 67 becomes YES and the flow returns to Step 64, wherein the playback mode is reset. Since Steps 64 to 67 are looped, the range of the slave tape T-1 thus rewound in the review mode according to the first remote control signal can be replayed repeatedly.

To switch the slave tape T-1 in the playback mode to the recording mode upon the termination of a step for learning, a second remote control signal (for recording) is transmitted from the remote control transmitter (not shown). The interruption is produced by the second remote control signal and a subroutine of FIG. 4-2 is called. In Step 72, the analog switch 9 is turned on according to the command from the output port O-4, and the slave tape T-1 is driven in the recording mode. The other analog switches are turned off at this time.

When a tape without the record tab is used as the master tape T-2, on the other hand, Step 42 becomes No as shown in the flowchart of FIG. 2 and the slave tape T-1 is driven in the recording mode (Step 45), whereas the master tape T-2 is driven in the playback mode (Step 46). The playback output of the master tape T-2, which is output from the video output terminal 19 and the audio output terminal 20 and then input to the video input terminal 3 and the audio input terminal 4, is recorded on the slave tape T-1.

A third remote control signal (or what is similar to the first remote control signal) is transmitted to replay the slave tape T-1 for learning purposes. The interruption occurs according to the third remote control signal as in the case where the first remote control signal is transmitted, and a subroutine of FIG. 4-3 is called. What makes this different from the case where the first remote control signal is transmitted is ascribed to the suspension of the master tape T-2 in Step 73. To stop the master tape T-2, it is only required to momentarily turn on the analog switch 26 according to the command from the output port O-5. In Step 74, a subroutine called "SUB" of FIG. 3 is called. As already given in the detailed description on the transmission of the first remote control signal, the content of "SUB" is to automatically repeat rewinding and replaying of the slave tape T-1. When proceeding to the next learning step, a fourth remote control signal (or what is similar to the second remote control signal discussed above) is transmitted to call a subroutine of FIG. 4-4 and the slave tape T-1 is switched over to the recording condition (Step 75), whereas the master tape T-2 remaining stationary is switched to the playback condition (Step 76).

A brief description will subsequently be given of a second embodiment.

The second embodiment uses only VCR-1 and does not use VCR-2. In this case, VCR-1 may be a video tape recorder specializing in playback and a tape already recorded is used. The present device is capable of either rewinding a range of the tape equivalent in length to the playback time set by the timer from any given position, replaying the range and then repeating the rewinding and replaying operation, or rewinding any range of the tape in the review condition from any given position, replaying the range and then repeating the rewinding and replaying operation. The aforementioned operation is carried out in conformity with the operating mode resulting from switching the changeover switch 29, and also performed according to a remote control signal from the remote control transmitter (remote control box) or by the direct operation of the operating buttons PLAY 1 and REW 1 attached to VCR-1. When studying in that range of the tape is terminated, the following range of the tape may be played back for learning purposes.

As set forth above, the second embodiment is in the form which excludes only the operation of switching over to the video recording mode from the first embodiment. Therefore, its flowchart will not be illustrated.

The present device is capable of endlessly repeating the rewinding and replaying operation by manipulating the playback button as stated above even if a tape for playback only is inserted into the compartment for T-1 instead of inserting the tape into the compartment for T-2. In this case, however, it has to be borne in mind that the tape could be worn out quickly.

In the first embodiment described above, the changeover switch 29 is used in order to change the operation mode of repetitive playback. However, it is possible to use a program, as a replacement of the changeover switch 29, such that the repetitive playback operation can be achieved by detecting a receiving time of the remote control signal or a pressing time of the playback button.

In view of the fact that video tapes of the type with tape ends are readily available, whereas endless video tapes are rather difficult to obtain as they are special ones and preset time is limited, for instance, to 20 seconds, tapes of the structure with tape ends have been adapted to use for repetitive playback without time limitation according to the present invention. Infinite repetitive playback of a given range of the tape, e.g., for the period of 30 seconds, is made possible by only pressing the pertinent button for a fraction of a second. In order to repeatedly replay a range for the period of about five minutes, the button is released immediately after the position of the tape to be stopped rewinding is confirmed by reviewing through a monitor the video on the tape being driven slowly in a rewind mode (a review mode) of a video tape recorder (VTR), and then a range up to the initial rewinding position is automatically and repeatedly played back. Such a complicated function can be implemented by using tapes of the same kind, more specifically, by operating two VTRs provided with the software thus appropriated. When a recorded tape protected from being erased is used specifically for playback with one VTR, moreover, the aforementioned automatic replaying operation of a desired range has been made possible for the first time. Consequently, the present invention is of great practical use.

What is claimed is:

1. A video tape recorder having a repetitive playback function, comprising:
   a video tape deck for a slave tape T-1;
   a video tape deck for a master tape T-2;
   operating means having at least two controls including a playback control and a record control;
   means for simultaneously driving T-1 and T-2 in a recording condition in response to a pressing of said record control;
   means for rewinding T-1 in a reviewing condition with T-2 being maintained in a recording condition in response to a pressing of said playback control; and means for automatically playing back the rewound portion of T-1 immediately after said playback control is released.

2. A video tape recorder having a repetitive playback function as set forth in claim 1, further comprising means for automatically repeating said rewinding and playing back operation.

3. A video tape recorder having a repetitive playback function as set forth in claim 1, further comprising means for detecting which type of tape is housed in a video tape deck for T-2 among two types of tapes, wherein one type is for recording general TV programs and the other type is for playing back only, wherein upon detection of a tape for recording general TV programs, both T-1 and T-2 simultaneously are driven in a recording condition immediately after turning on a power switch and pressing a record control, but upon detection of a tape for playing back only, T-1 is driven in a recording condition and T-2 in a playback condition immediately after turning on a power switch and pressing said record control.

4. A video tape recorder having a repetitive playback function as set forth in claim 3, wherein upon detection of said tape for playing back only, when a playback control is pressed while T-1 is driven in a recording condition and T-2 in a playback condition, T-1 is automatically and repeatedly played back, but driving of T-2 is suspended, and once a record control is pressed again after the completion of study of video on tape T-1, T-1 is driven in a recording condition and T-2 is a playback condition.

* * * * *